(12) United States Patent
Lapuyade

(10) Patent No.: US 8,769,551 B2
(45) Date of Patent: Jul. 1, 2014

(54) SYSTEM AND METHOD FOR INTERPROCESS COMMUNICATION IN ELECTRONIC DEVICES

(75) Inventor: Eric Lapuyade, Languedoc-Roussillon (FR)

(73) Assignee: Access Co., Ltd., Chiyoda-ku (JP)

( * ) Notice: Subject to any disclaimer, the term of this patent is extended or adjusted under 35 U.S.C. 154(b) by 1053 days.

(21) Appl. No.: 12/026,547

(22) Filed: Feb. 5, 2008

(65) Prior Publication Data

US 2008/0276254 A1 Nov. 6, 2008

Related U.S. Application Data

(60) Provisional application No. 60/888,531, filed on Feb. 6, 2007.

(51) Int. Cl.
*G06F 9/54* (2006.01)

(52) U.S. Cl.
CPC ...................................... *G06F 9/542* (2013.01)
USPC ............................. 719/318; 719/328; 455/418

(58) Field of Classification Search
None
See application file for complete search history.

(56) References Cited

U.S. PATENT DOCUMENTS

| | | | |
|---|---|---|---|
| 6,052,710 A * | 4/2000 | Saliba et al. | 709/203 |
| 6,268,852 B1 * | 7/2001 | Lindhorst et al. | 715/744 |
| 6,542,734 B1 * | 4/2003 | Abrol et al. | 455/412.1 |
| 7,013,329 B1 * | 3/2006 | Paul et al. | 709/217 |
| 7,471,947 B1 * | 12/2008 | Papineau | 455/418 |
| 2003/0009602 A1 * | 1/2003 | Jacobs et al. | 709/318 |
| 2004/0216134 A1 * | 10/2004 | Hammerich et al. | 719/318 |
| 2005/0172282 A1 * | 8/2005 | Shenfield et al. | 717/174 |
| 2005/0238046 A1 * | 10/2005 | Hassan et al. | 370/465 |
| 2006/0160529 A1 * | 7/2006 | Glass | 455/418 |

* cited by examiner

*Primary Examiner* — H S Sough
*Assistant Examiner* — Syed Roni
(74) *Attorney, Agent, or Firm* — Baker & Hostetler LLP

(57) ABSTRACT

In an electronic device, a method of enabling a first application to employ an action/data handler of a second application includes registering the handler of the second application, receiving an incoming request for the handler from the first application, matching the handler in the request to the handler registered by the second application, delivering the request to the second application for execution and returning a result of execution to the first application. An electronic device comprises an operating system supporting i) an application layer that includes one or more applications having action/data type handlers. The electronic device also includes ii) an exchange manager interfacing with the application layer to provide a central location for registry of the handlers of the one or more applications, and iii) transports coupled to the application layer and exchange manager and adapted to receive incoming requests to employ the handlers of the one or more applications.

14 Claims, 4 Drawing Sheets

SYSTEM AND METHOD FOR INTERPROCESS COMMUNICATION IN ELECTRONIC DEVICES

CLAIM OF PRIORITY

This application claims the benefit under 35 U.S.C. §119 (e) of U.S. Provisional Patent Application Ser. No. 60/888, 531, entitled "Exchange Manager", filed on Feb. 6, 2007, which is also expressly incorporated by reference in its entirety herein.

BACKGROUND OF THE INVENTION

1) Field of the Invention

The present invention relates generally to the field of electronics devices and more particularly, to a system and method for managing inter-application and inter-device communication in an electronic device.

2) Background

Electronic devices equipped with microprocessors now have the ability to run many different applications and processes simultaneously and thereby provide a great amount of functionality to the user. The electronic devices may have a software operating system that supports application program interfaces (APIs). Certain APIs may provide for inter-communication between applications so that, for example, service requests can be passed from one application to another application or system component. If a requesting application can identify the application to which it intends to deliver a request, the inter-application process may be straightforward. However, this information is not always readily available, and thus the requesting application may not be able to directly access the server application in this straightforward manner. Consequently, a need exists to provide applications access to the functionality of unidentified applications.

SUMMARY OF THE INVENTION

In a first aspect, the present invention provides a method of enabling a first application to employ an action/data handler of a second application. The method includes: (1) registering the handler of the second application, (2) receiving an incoming request for the handler from the first application, (3) matching the handler in the request to the handler registered by the second application, (4) delivering the request to the second application for execution; and (5) returning a result of execution to the first application.

In a second aspect, the present invention provides an electronic device comprising 1) a processor adapted to support an operating system that includes i) an application layer including one or more applications, the one or more applications including action/data type handlers, ii) an exchange manager interfacing with the application layer, the exchange manager being adapted to provide a central location for registry of the handlers of the one or more applications, and iii) transports coupled to the application layer and exchange manager and adapted to receive incoming requests to employ the handlers of the one or more applications, 2) and a transceiver coupled to the processor adapted to send and receive communication signals.

Additional features and advantages of the invention will be set forth in the description which follows, and in part will be obvious from the description, or may be learned by practice of the invention.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention provides a method and system for enabling an application or system component to request another system component to perform some action on some data, without the requesting component having any knowledge of which system component will actually perform the action and carry out the request. The system may comprise a plurality of electronic devices that may establish communication links as needed. An application running on a requesting device may specify that the action be performed by other applications running on the device (i.e., locally) or alternatively, may specify a remote destination device for performing the action and fulfilling the request.

The present invention also provides an exchange manager operating system component to control this process. The exchange manager is an application program interface (API) that allows an application to defer the performance of certain operations on data to another application that is better suited to perform such operations. As discussed in great detail below, the exchange manager obtains knowledge of the capabilities of various applications running on the device, and is thereby able to route requests to the application best suited to perform the requested action.

The ability to defer the performance of certain operations provides greatly expanded functionality. For example, an application running on a local device can request that certain operations, such as data extraction, be performed on a remote device, enabling the data on the remote device to be accessed from the local application.

Figure 1:
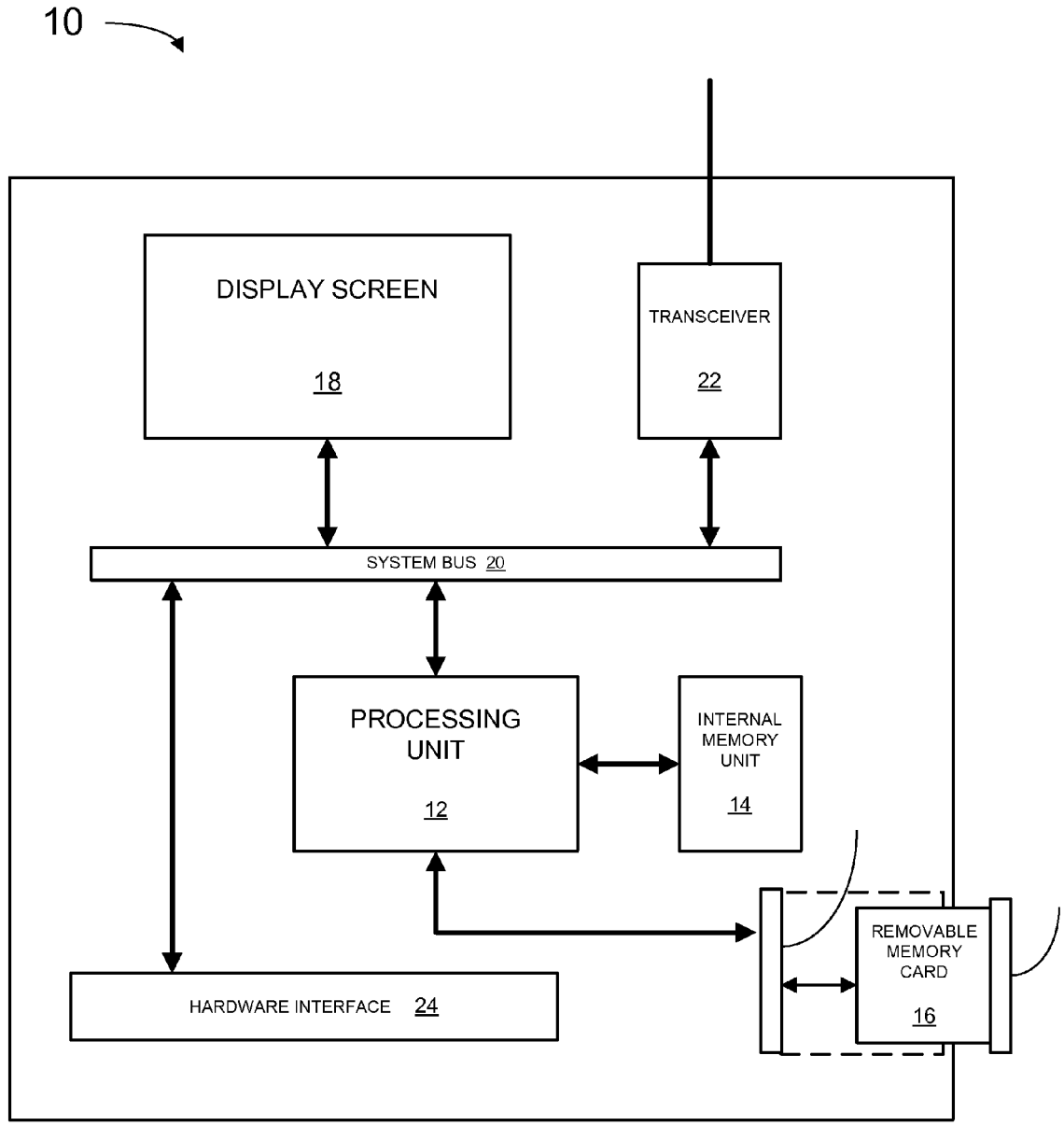
FIG. 1 is a block diagram of an electronic device according to an embodiment of the present invention.

FIG. 1 is a schematic block diagram of an exemplary electronic device 10 embodied in accordance herewith which may comprise a portable computer, a personal digital assistant (PDA), an enhanced cell phone, an 'information appliance' constituting an electronic device having a limited manual input interface such as a television, a set top box, and an automotive navigation device, or any other device having an embedded processor and the ability to communicate signals (wired or wireless). The electronic device 10 includes a processing unit 12 adapted to run an operating system platform and application programs. The electronic device 10 further includes memory storage devices such as an internal memory unit 14, which may comprise an internal memory card (e.g., SIM card) and removable memory 16.

A display screen 18 is coupled to the processing unit 12 via a system bus 20 for receiving data input. A transceiver unit 22 provides for transmission and reception of wireless signals over a designated range of frequencies, allowing the electronic device 10 to connect to external devices and networks such as a wireless telephone network or the Internet. Data received from external sources via the transceiver 22, such as media content obtained from an online depot, may be delivered via the system bus 20 to the processing unit 12 and thereafter stored in memory units 14, 16. A hardware interface 24 may be coupled to buttons and/or switches on the body of the electronic device 10 (not shown) to provide signals to the processing unit 12 regarding the state and operation of such switches and buttons.

Exchange Manager

Figure 2:
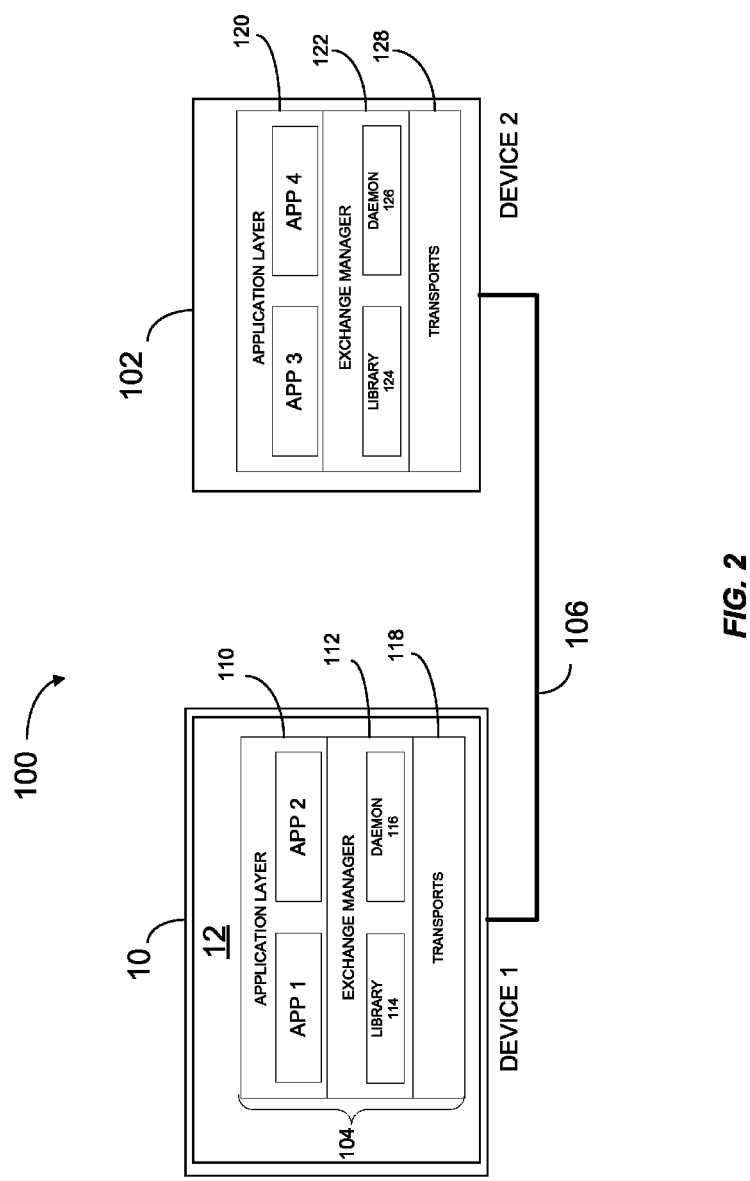
FIG. 2 is a block diagram of an operating system of an electronic device according to an embodiment of the present invention.

FIG. 2 is a block diagram of a computer system 100 including an electronic device 10 and a remote electronic device ('remote device') 102, which each include an exchange manager as provided according to an embodiment of the present invention. The electronic device 10 and the remote device 102 may communicate over a wired or wireless link 106. The operating system components discussed below may be part of the Hiker Project components of the Access Linux Platform produced by Access Co. Ltd of Tokyo, Japan. It is noted that although only two devices 10, 102 are shown, it is to be appreciated that both devices 10, 102 may be linked to other devices (not shown) via a network or otherwise.

The processor 12 of electronic device 10 may execute an operating system 104 stored on internal memory 14 (FIG. 1). The operating system 104 may includes an application layer 110 which includes programs (applications) installed on the electronic device 10 that may be launched, used and exited at the user's discretion such as, for example, a home screen, telephony, email and messaging programs, media players, web browsers, etc. Importantly, applications may also be used to perform services (actions) requested by other applications or devices depending on their capabilities as will be discussed further below. In the depicted embodiment, application layer 110 includes two exemplary applications, App 1 and App 2. It is noted that the application layer 110 may contain any number of applications. Operating system 104 also includes an exchange manager 112 which is an application program interface (API) that acts as a central broker to manage inter-application/inter-device communication, for example, between App 1 and App 2 and between electronic device 10 and remote device 102. The exchange manager 112 is adapted to initiate mechanisms used for sending and receiving requests to or from App 1 and App 2 and to dispatch requests to appropriate applications for execution.

Requests in this context may be defined as commands to perform some action on specified data. In some embodiments of the present invention, an action request is a data structure that includes a verb, such as "get", "store", and "play", and a data type, which may be implemented as a MIME type (Multipurpose Internet Mail Extension), such as text/vCard. The verb may be accompanied by further parameters which may be defined by a tag/value pair. Parameters may be used by a handler to determine how to perform the requested action or how the request is transmitted. For example, parameters may be used to indicate the targeted destination (e.g., local or remote) of the request. The data in the request may be identified by file descriptor or by URL (Universal Resource Locator). The exchange manager 112 is extensible, so that new handlers can be created for new data types and actions as well as for new transports.

In accordance with the present invention, actions are performed by 'handlers', each of which is designed to handle a single verb/MIME-type pair. Applications such as App 1 and App 2 may register handlers they contain in a manner which allows other applications and devices access to the handlers. There may be multiple handlers for a given verb/MIME-type; however, an application may specify that a handler it registers is unique, in which case, there may only be a single operating handler for the verb/MIME-type of that handler. The applications App 1, App 2 register the handlers they contain at the exchange manager 112. In this manner the exchange manager 112 has knowledge of the applications at which the registered handlers on electronic device 10 reside and can invoke the application appropriate to obtain use of a particular handler. During registration of a handler, an application (e.g., App 1) may specify that only local requests for use of the handler are to be accepted. In this case a request from App 2 will be accepted, while a request from remote device 102 will not be accepted. Handlers can be registered or unregistered at any time. For example, in the case of a multi-player game application having a 'moveplayer' action (a handler to receive other players moves) rather specific to the application, the handler may be registered when the application is launched, and then unregistered when the application quits as it is unlikely to be needed by another application or device.

Specific applications may be particularly suitable for implementing certain handlers. Table 1 below provides a list of verb/MIME-type pairs with a proposed application which may be particularly suited to implement each handler. For each action, parameters may be defined to modify the handler behavior. The data-types listed in Table 1 include: jpg, gif, mp3 and mpeg. Certain vObjects that may be handled in standard manner include vCard, vCal and vMemo. vObject types may have equivalent types when transferred as non\-vObjects (e.g., during native exchange manager transfer).

TABLE 1

| verb | data type | parameters | handled by |
|---|---|---|---|
| store | prc, pdb (or equivalent) | | launcher |
| store | jpg, gif, mpeg | | medias |
| store | mp3 | | realplayer |
| store | vCard, .vcf | | contact |
| store | vCal, .vcal | | agenda |
| store | vMemo, .txt | | memopad |
| get | .vcf | 'name': requested contact | contact |
| play | .mp3 | 'sound_device': where to output the sound (speaker, Bluetooth headset) | realplayer |
| play | .mpeg | 'sound_device': where to output the sound (speaker, Bluetooth headset) | medas |
| display | .jpg, .gif | | medias |
| display | .vcf | 'name': contact to display | contact |
| * | * | 'description': human readable description of the data. e.g. "Eric's visit card", or "John's photo" | * |

The exchange manager 112 also includes a library module 114 which stores a number of call-up procedures for launching other modules and a daemon 116 which, in some embodiments, may be implemented as a single thread that continually monitors for incoming requests as described below.

Figure 3:
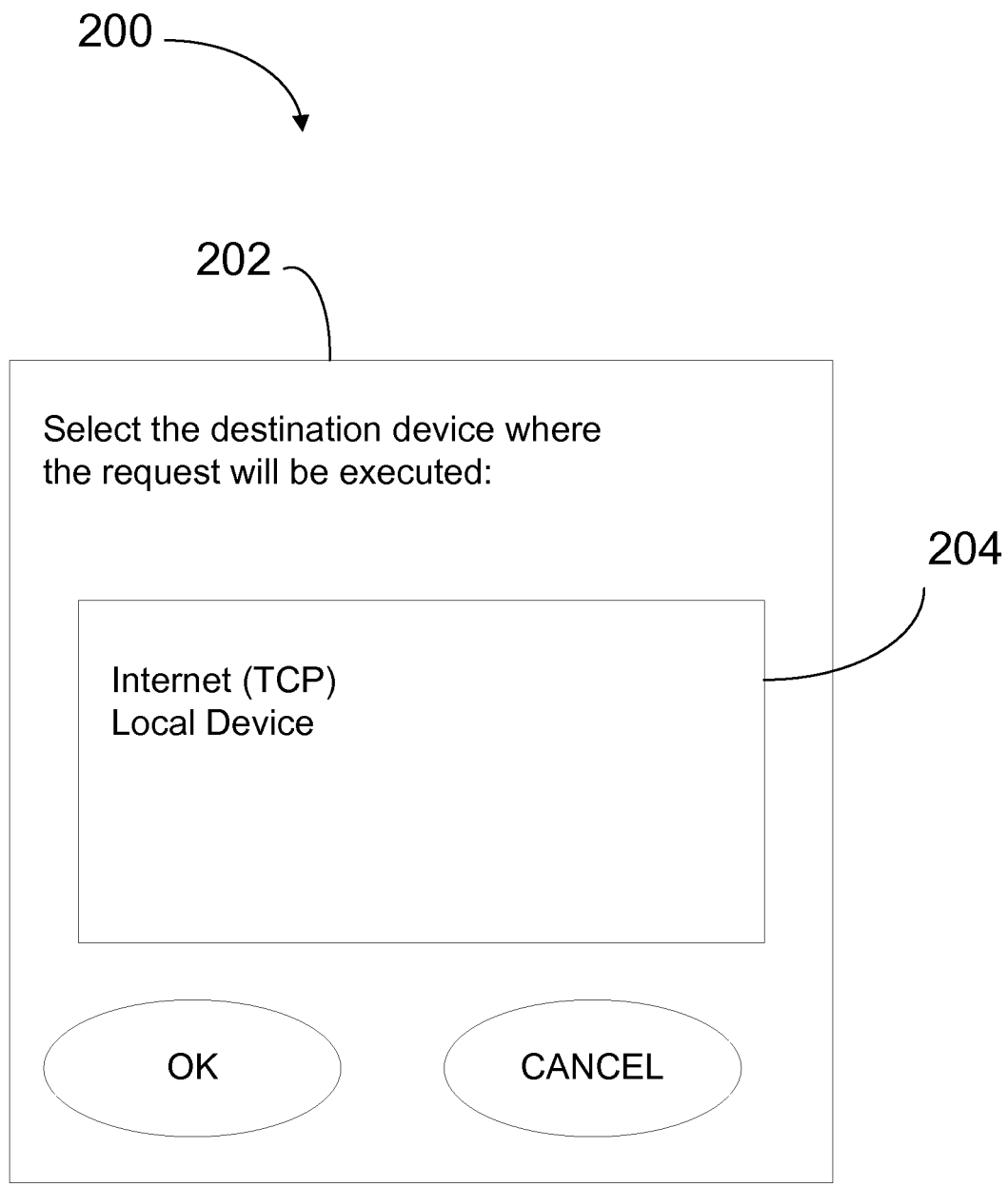
FIG. 3 is a view of a graphics screen showing an example user interface (UI) dialog that displays a list of selectable destinations for sending a request for a handler according to an embodiment of the present invention.

Transports 118 comprise independent modules (e.g., plug-ins) that are adapted to communicate requests from a source (device with requesting application) to the destination (device with the registered handler). As noted, the source and destination may be different devices or may be the same device. The transports 118 are adapted to implement both sending and receiving functions, and to interface with the exchange manager 112 to dispatch the request to the appropriate handler. The transports 118 may include modules for communicating under several protocols including, for example, Local, IrDA® (infrared), Bluetooth®, SMS and TCP. In some embodiments, a user interface (UI) dialog may be provided to allow a user to select a transport. The exchange manager 112 may invoke a UI dialog if transport information is not included in a request. In addition, the transports 118 scan the request to parse the destination address. If the destination address is not included in a request, the transports 118 may invoke a UI dialog to allow the user to select an address. FIG. 3 shows an example UI dialog 200 adapted for this purpose. As shown the UI dialog 200 comprises a depicted box 202 that displays a list 204 of destinations, in this case consisting of the Internet (TCP) and the local device (e.g., electronic device 10). The user may select one of these destinations from the list and click the OK button which then causes the request to be directed to the selected destination.

The remote device 102 (FIG. 1) may include similar operating system components to electronic device 10, including an application layer 120 having example applications App 3 and App 4, an exchange manager 122 (including library module 124 and daemon 126), and transports 128. The communication link between the electronic device 10 and remote device 102 may occur over a wireless connection 106 as indicated above and communication over the link may take place using one or more of the protocols listed above.

Exemplary Method

Figure 4:
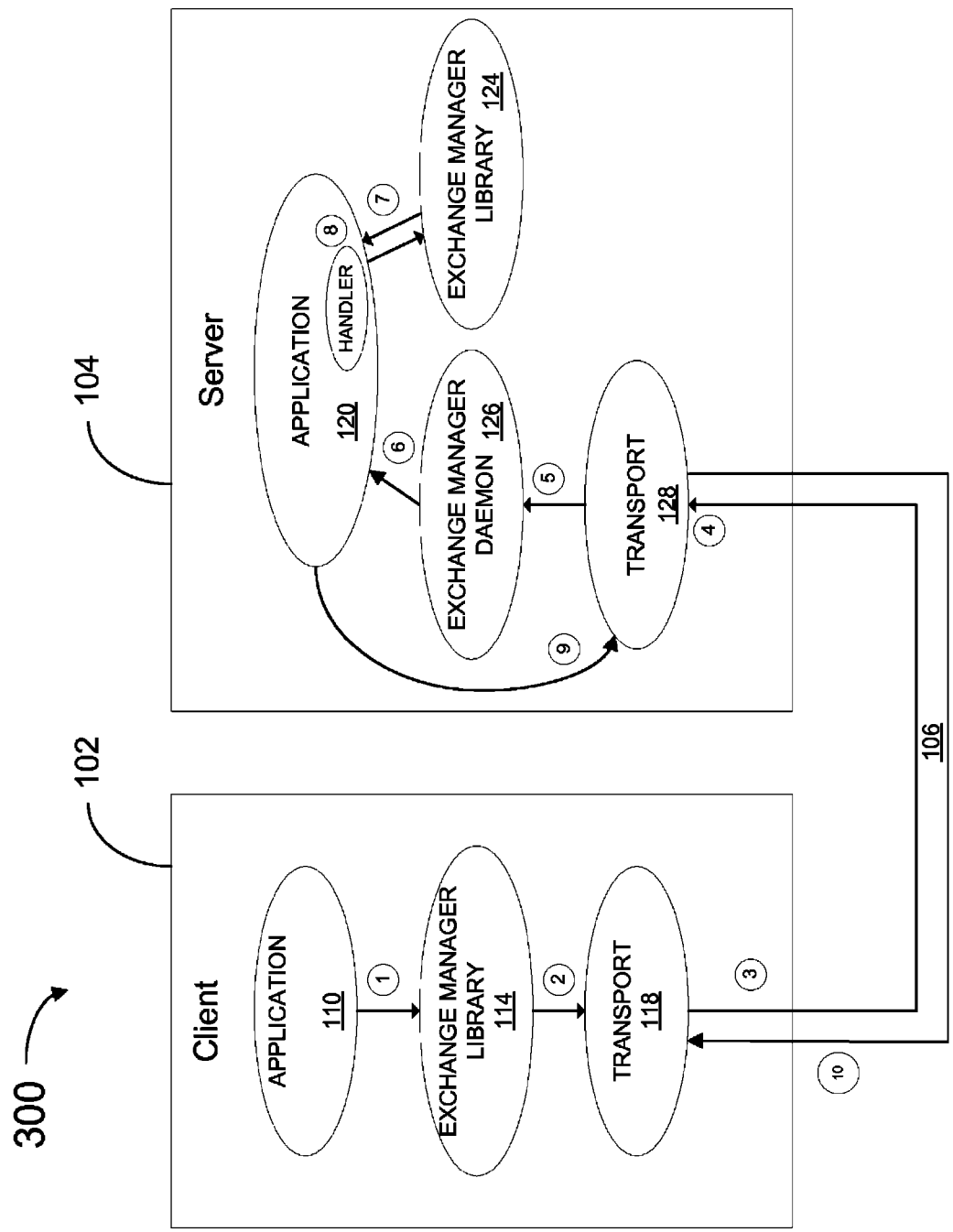
FIG. 4 is a flow diagram of a method of enabling a first application to employ the use of handler of a second application residing on an electronic device according to an embodiment of the present invention.

FIG. 4 is a flow diagram illustrating a method 300 whereby a first application to employs the handler of a second application residing on a remote device according to an embodiment of the present invention. Specific procedural steps listed below are marked in sequence with numbered circles in the figure. In the example shown, a request for an action/data handler is made from electronic device 10 (referred to as the 'client device' for ease of reference), and the corresponding action/data handler for request resides in remote device 102 (referred to as the 'server device' for ease of reference). It is again noted that the methods described herein apply equally when the request is handled locally (i.e., when the client device includes the requested handler in a different application).

At the client device 10, an application (e.g., App 1) sends a request to the exchange manager 112 to employ a handler not immediately accessible by App 1 (procedure 1). The exchange manager library 114 then calls a transport module 118, which, in some embodiments, runs in the thread of App 1 (procedure 2). The transport module 118 then opens a connection with the server device 104 as determined by the request or by the user via a UI (procedure 3).

At the server device 104, the exchange manager daemon 126 is launched at boot time or subsequently, as a continually running thread or background process. In some embodiments, the daemon thread runs an event loop (e.g., a Glib loop) to monitor for incoming messages. The transports 128 at the server device 104 will 'plug in' to the daemon when by adding their event sources. For some transport modules, such as TCP, the event source is a file descriptor. The event sources of the transports 128 indicate whether an incoming connection has been established, and thus, through monitoring the transports 128, the daemon 126 is able to detect an incoming connection from the transports 128.

Returning to the illustration of FIG. 4, when an incoming connection is established with a transport 128 at the server device 104, the transport 128 accepts and validates the connection. In general, the validation process may depend on the type of transport 128 employed. For many transport modules, such as IR and Bluetooth®, a trustworthy connection may be assumed, for others, such as TCP, there may be list of trusted IP addresses whose connections are accepted without questions; otherwise, the user may be asked to validate the connection. Once the connection is validated, the transport 128 will read the parameters and create a request identical, in terms of verb/MIME-type and parameters to the sent request (procedure 4). The data may be copied into a temporary file as a request object if the transport is not local. Once an incoming request has been re-formed, the transport 128 delivers the request to the daemon 126. Once an incoming request has been formed, the transport 128 hands it to the daemon 126 by calling a function that places the request in the daemon processing loop queue so as to be acted on as soon as possible (procedure 5). The transport 128 then waits for the result.

When the exchange manager daemon 126 reaches the request on the queue, the daemon 126 determines which application registered the handler that matches the verb/MIME-type of the request. For the sake of illustration, this is taken to be App 3. The daemon 126 then launches application App 3 (procedure 6). The application App 3 accesses the exchange manager library 124 to obtain the request object and to extract the parameters and data of the request (procedure 7), shown with two arrows indicating the two-way flow of data). Upon obtaining all data pertinent to the request, the application operates on the data in the prescribed way using the appropriate handler (procedure 8). The handler of App 3 then returns the result of the operation on the data of the request back to the transport 218 (procedure 9) and the server transport 218 communicates the result to the client transport 118 over the communication link 106, and the request is then passed on through the exchange manager 112 to the requesting application App 1 (procedure 10), completing the process. The result may merely be a message indicating that the operation has been performed (e.g., in the case of a store action) or may include data resulting from the operation, in which case it is possible to retrieve data, or to pass data and get it back in a modified form.

After the result is sent back to the client device 10, the transport 118 at the client device 10 closes the connection to the server 104. If the transport 118 is subject to an unrecoverable error that prevents it from continuing to run, the transport 118 may inactivate itself and notify the daemon 116. When appropriate, the daemon 116 may close the transport 118 and attempt to reinitialize it. If this fails, the transport 118 may be left closed.

Security

In some embodiments, user control as to who is allowed to connect to a user's device and request action from it is provided. Security may be based using several mechanisms. Default handlers for a bunch of published standard services may be provided. In the event that a third party application attempts to register a duplicate handler, and a first handler declared it to be unique, the user may be alerted and asked to arbitrate which application should be the installed handler. Thus, the user determines which handler wins in case of conflict (regardless of which handler is installed first).

If there is a non-authenticated incoming connection, the user may be asked to authorize the connection. A local communication (e.g., via a Local transport) is initiated by the user and is always valid. An IR (infrared) transport is considered authenticated, as the user attempt to receive communication from the initiator typically explicitly directs his/her device to the initiator to allow reception. Paired Bluetooth® is also authenticated by definition. TCP may be considered authenticated if the source IP address is listed in a table of trusted sources. A TCP transport (on the server side) may also be configured to require a challenge password before it accepts to read from the connection. In addition, above the connection level authentication, in some embodiments, handlers may also require permission from the user before they perform their action. This may be handler specific. For example, the handler for 'get vCard' may be a suitable candidate to require user authorization.

Example 1

Beam a vCard Using Compatible Obex Protocol

Initially, at the client, a transport (e.g., IrDA®) may be used to determine if the request is a 'compatible' send or a native request send. The client composes a vCard using a PDI (Personal Data Interchange) library and forms the following handler request:
Verb: 'send_obex_legacy'
MIME type: text/vCard
Object reference: file descriptor to a memory chunk reader
The exchange Manager of the client executes the request by passing it down to the selected transport (IR, in this case). The transport recognizes that the client wants to perform a 'compatible' Obex send, and builds a message for an IRDA® Server/OpenObex daemon at the server exchange manager and then sends the message. As there is no bidirectional communication when using Obex, the result of the send operation itself is returned.

At the server, the data is received by the IRDA® Server/Openobex daemon at the exchange manager. Once the data is received, the daemon sends it via a message (e.g., a DBUS message) to an event monitor. At some point, an event triggers a function in the transport to notify of the incoming data. The transport then builds a received request and may dispatch it to the exchange manager daemon. The handler result that is ultimately returned to the transport will be discarded since it cannot be sent back when using 'compatible' Obex.

Example 2

Beaming a vCard (Using any Transport)

If the requesting application at the client wants to use more advanced functionality than what is possible with 'compatible' Obex, it may specify another verb. In this case, the client application sets up the vCard data in the format described by the specific handler specification and forms the following handler request:
Verb: 'store'
MIME type: application/vcf
Object reference: file descriptor to a memory reader
The exchange Manager executes the request by passing it down to the selected transport. The transport establishes a connection to the destination, and sends the request and the data through the connection (transport dependant). The transport waits for the destination to reply with the result request. Once the reply is received and sent back to the client, the transport closes the connection. At the server, the corresponding transport receives the connection, reads the parameters and data, builds a received request and dispatches it to the exchange manager daemon. It then waits for the handler to send the result request, which it sends back to the client. It then waits for another request to come, or a connection hang-up.

Example 3

Viewing an Attachment

A mail application receives a message (e.g., using POP3) with an attachment, for instance a wave sound file. The user clicks on the attachment. The application forms the following handler request:
Verb: 'play'
MIME type: audio/wav
Object reference: file descriptor to the open wav file.
The media player is launched above the mail application and plays the sound. The handler determines how it the sound is played (synchronously, asynchronously), whether it shows UI or not, etc.

Example 4

Looking Up a Contact Email while Composing a Message

The user composes a message using the email application and looks up the email address of his contact. The application forms the following handler request:
Verb: 'get'
MIME type: application/vcf
Object reference: no data is sent
Parameters: 'contact': name whose email is searched, and 'lookup field': name of the field that is requested ('email' in this case).
The request is executed as already mentioned in the previous use cases. Upon return, the email application gets back the desired address as a result. The handler specification may state, for example, that the looked up email will be found in a 'result_email' parameter.

It is to be understood that the illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. In addition, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. In an electronic device, a method of enabling a first application executed on the electronic device to employ an action/data-type handler of a second application comprising the steps of:
    registering the handler of the second application, wherein the handler is designed to handle a single verb/Multipurpose Internet Mail Extension (MIME)-type pair;
    receiving an incoming request including the verb/MIME-type for the handler from the first application, wherein the incoming request includes a parameter to direct performance by the handler;
    determining which application registered the handler that matches the verb/MIME-type pair of the request, based on the determination that the second application has registered the handler that matches the verb/MIME-type of the request, determining if the parameter specifies a local request then the handler in the request is only matched if the second application is local and wherein if the parameter specifies a remote request then the handler in the request is only matched if the second application is remote;

delivering the request to the second application for execution in response to the handler in the request being matched to the handler registered by the second application; and returning a result of execution to the first application.

2. The method of claim 1, further comprising:

providing a first device and a second device, wherein the first application resides on the first device, and the second application resides on the second device;

employing a transport to establish communication between the first device and the second device; and validating the communication between the first device and the second device prior to receiving the incoming request for the handler from the first application.

3. The method of claim 1, wherein the first application resides on a first device, and the second application resides on a second device, and wherein both the first device and the second device include an exchange manager for registering respective application handlers.

4. The method of claim 1, wherein the first application resides on a first device, and the second application resides on a second device, wherein the first device is a mobile device.

5. The method of claim 4, wherein the handlers are registered at application interfaces in the first device and the second device.

6. An electronic device comprising:

a processor adapted to support an operating system including:

an application layer including one or more applications, the one or more applications including action/data type handlers designed to handle a single verb/Multipurpose Internet Mail Extension (MIME)-type pair;

an exchange manager adapted to interface with the application layer and to provide a central location for registry of the handlers of the one or more applications;

transports coupled to the application layer and the exchange manager and adapted to continually monitor and receive incoming requests to employ the handlers of the one or more applications, wherein a request from a requesting application includes the verb/MIME-type, and a parameter and wherein the processor is configured to determine if the parameter specifies a local request then the handler in the request is only matched if a second application which registered the handler that matches the verb/MIME-type pair of the request is local and wherein the processor is configured to determine if the parameter specifies a remote request then the handler in the request is only matched if the second application which registered the handler that matches the verb/MIME-type pair of the request is remote; and a transceiver coupled to the processor adapted to send and receive communication signals.

7. The electronic device of claim 6, wherein the exchange manager is further adapted to deliver requests received from the one or more applications in the application layer to the transports.

8. The electronic device of claim 7, wherein the transports are further adapted to transmit outbound requests received from the exchange manager.

9. The electronic device of claim 6, wherein the electronic device is a mobile device.

10. The electronic device of claim 6, wherein the electronic device is an information appliance having a limited manual input interface.

11. A system of displaying content to a user on an electronic device having an operating system that supports a first application, the system comprising:

a transceiver for receiving an incoming request for an action/data handler including a single verb/Multipurpose Internet Mail Extension (MIME)-type pair from an application;

a processor adapted to support the system, the processor being configured to receive the incoming request and match the incoming request to a handler designed to handle a single verb/MIME-type of a destination application which registered the handler that matches the verb/MIME-type pair of the request, wherein a request from a requesting application includes a parameter and wherein the processor is configured to determine based on the matching of the request to the handler designed to handle a single verb/MIME-type of the destination application if the parameter specifies a local request then the handler in the request is only matched if the destination application is local and wherein the processor is configured to determine if the parameter specifies a remote request then the handler in the request is only matched if the destination application is remote;

a display for displaying a list of destination devices for the incoming request selectable by the user; and a communication link for delivering the incoming request to a selected destination.

12. The system of claim 11, wherein the processor is configured to perform transport logic for opening a connection between the electronic device and the destination.

13. The system of claim 12, wherein the display displays a list of selectable connection protocols usable by the transport logic for opening the connection.

14. The system of claim 11, further comprising:

storage capability for registering action/handlers of the first application.

* * * * *